(No Model.) 9 Sheets—Sheet 1.
R. J. HOLMGREEN.
MACHINE FOR TURNING BROOM HANDLES.
No. 422,053. Patented Feb. 25, 1890.
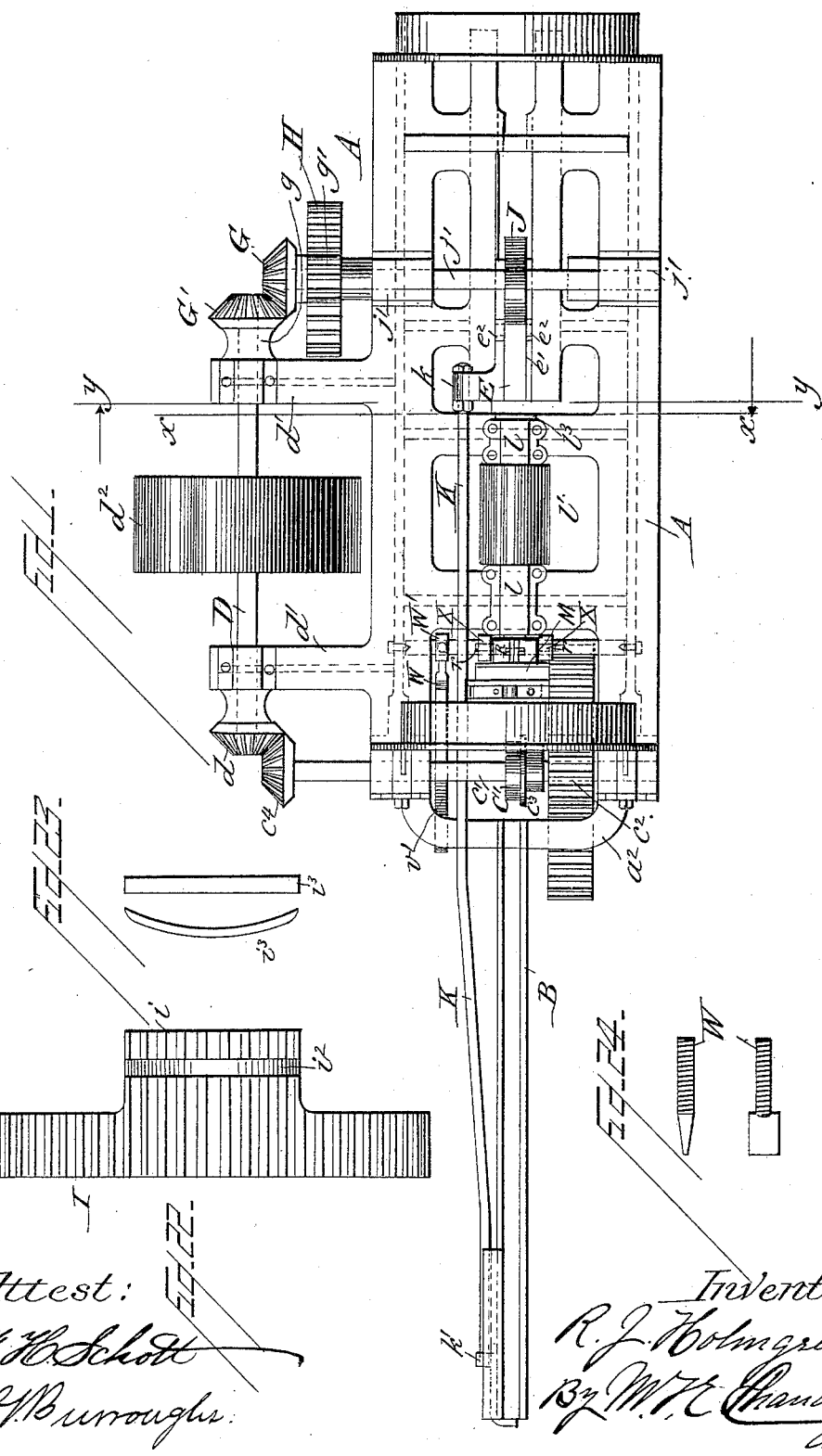
Attest:
F. H. Schott
G. Burroughs
Inventor:
R. J. Holmgreen
By W. T. E. Chandler
Atty (No Model.) 9 Sheets—Sheet 2.
R. J. HOLMGREEN.
MACHINE FOR TURNING BROOM HANDLES.
No. 422,053. Patented Feb. 25, 1890.
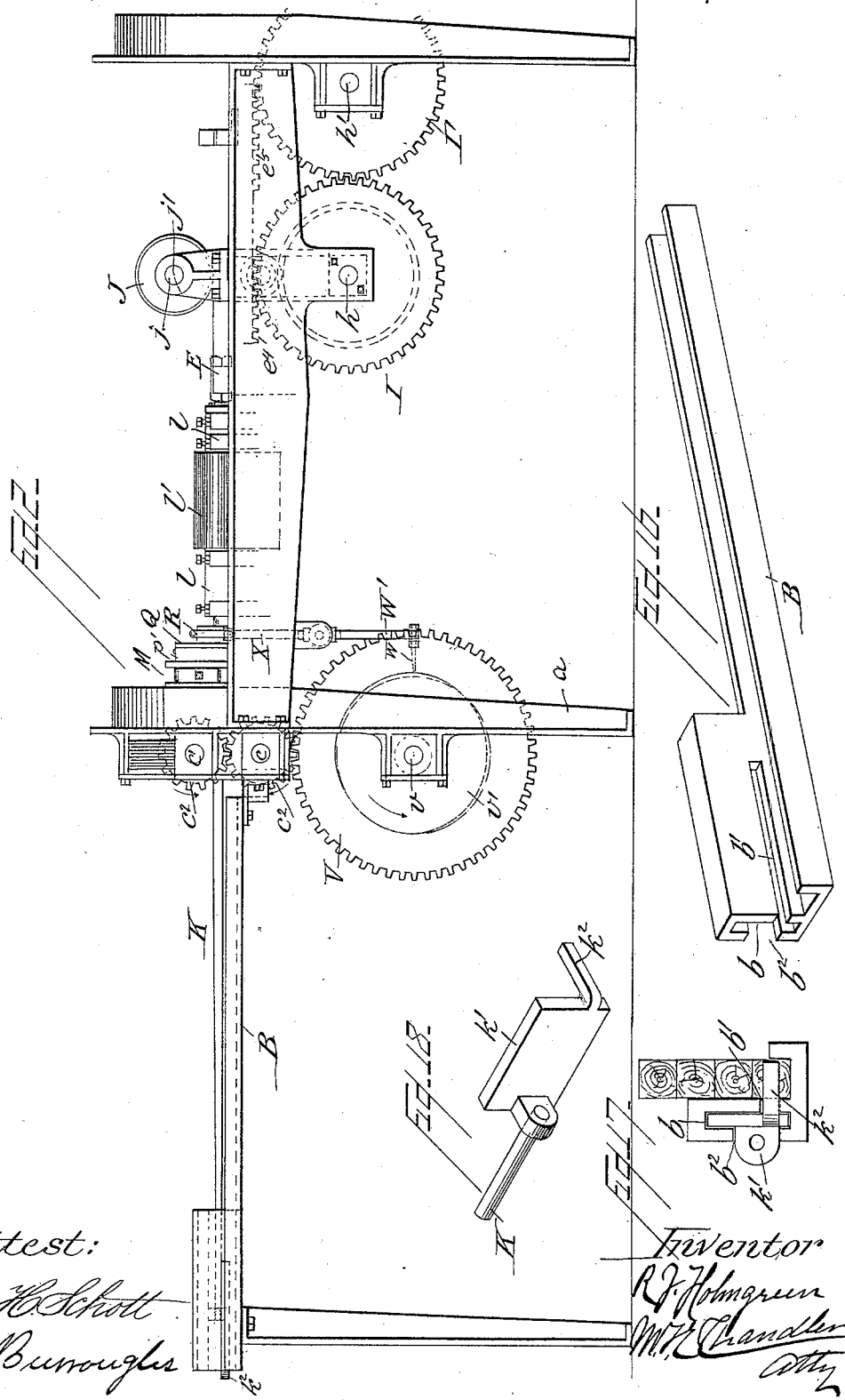
Attest:
F. H. Schott
E. W. Burroughs
Inventor
R. J. Holmgreen
M. H. Chandler
Atty

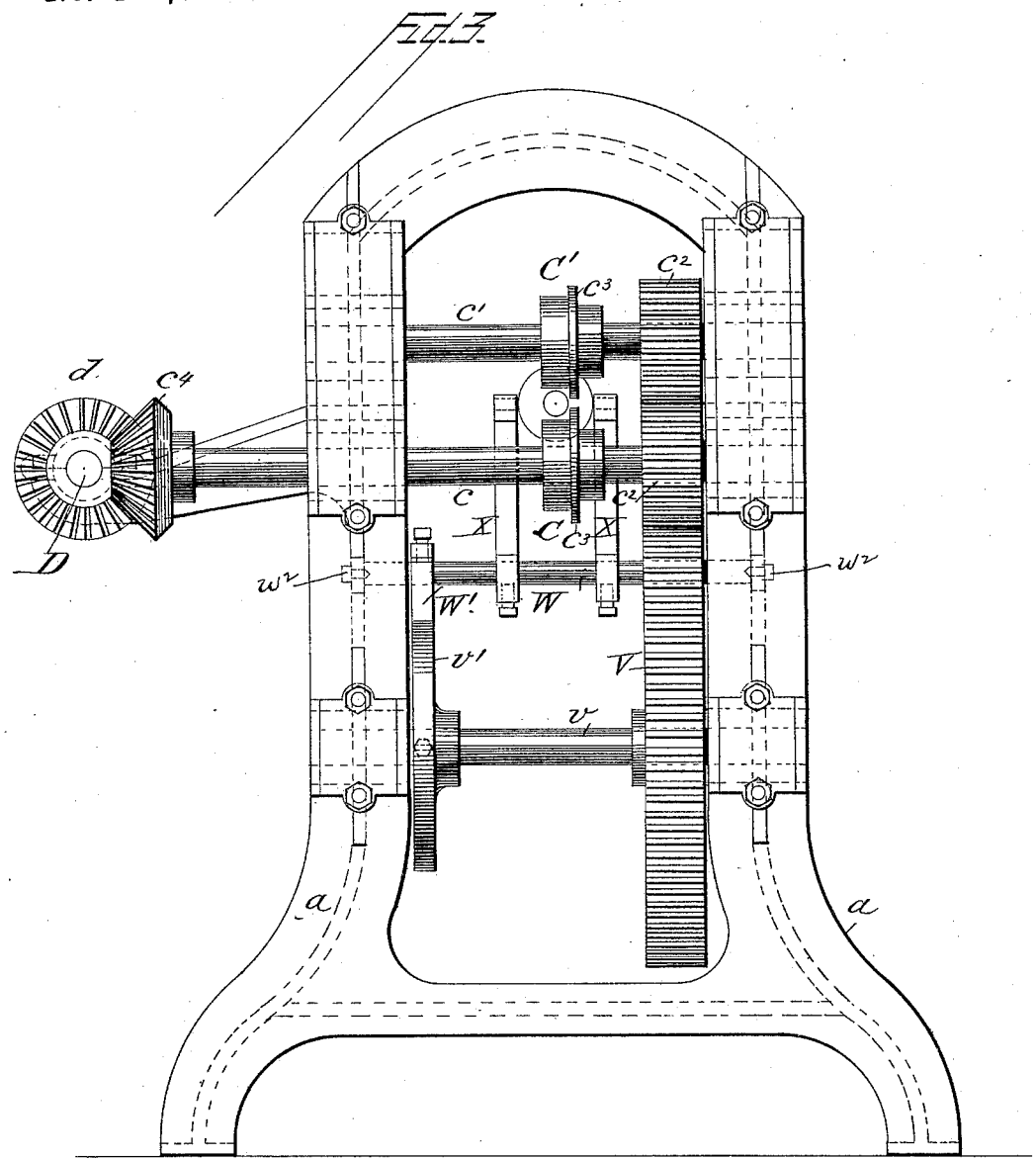

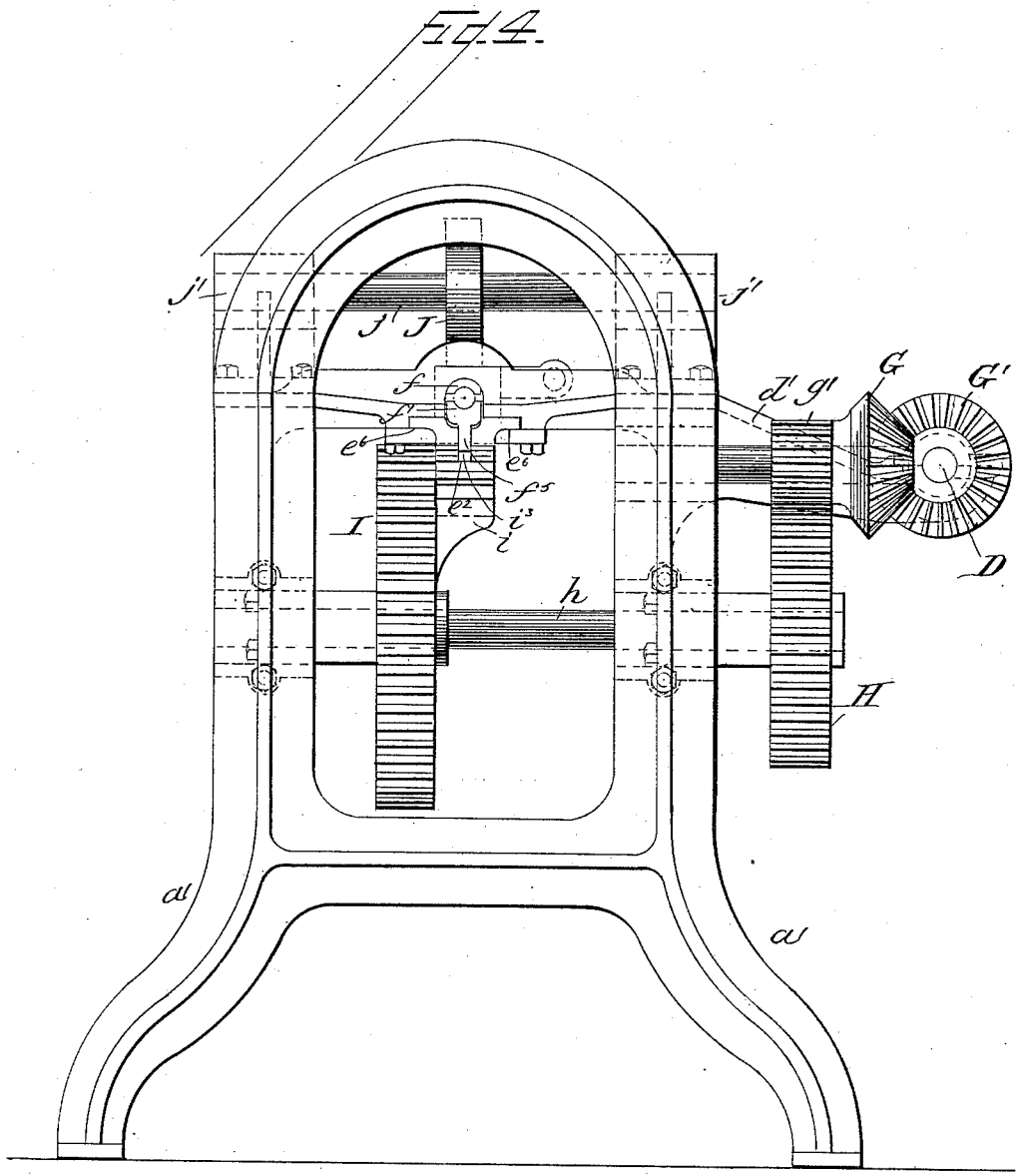

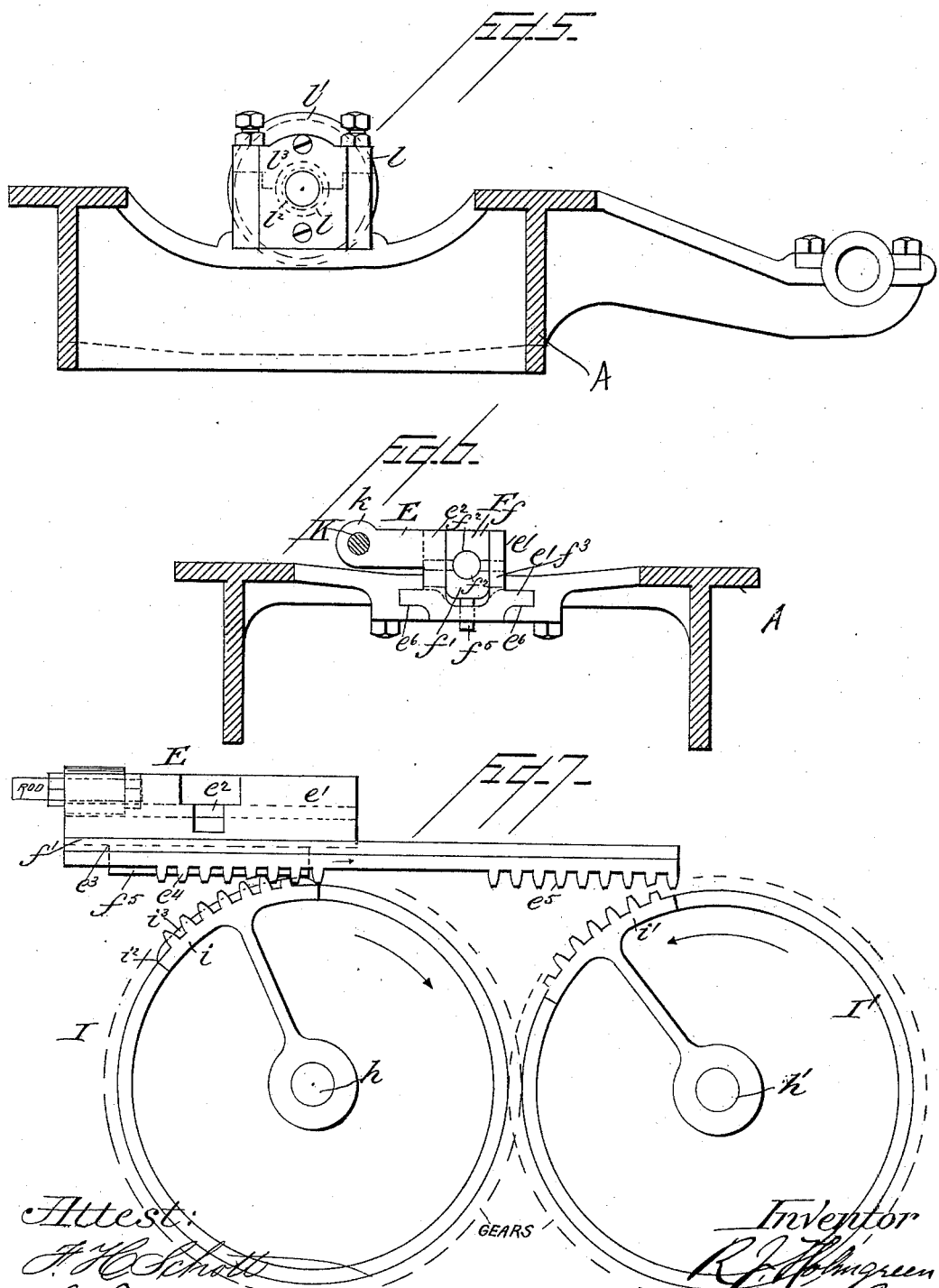

(No Model.) 9 Sheets—Sheet 6.
R. J. HOLMGREEN.
MACHINE FOR TURNING BROOM HANDLES.
No. 422,053. Patented Feb. 25, 1890.
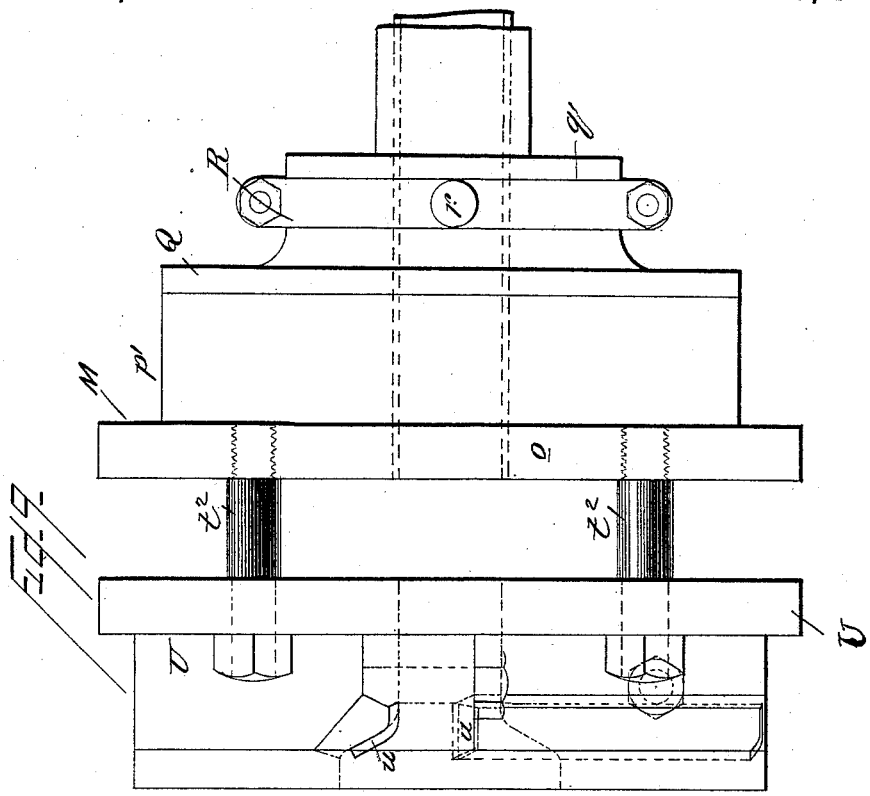
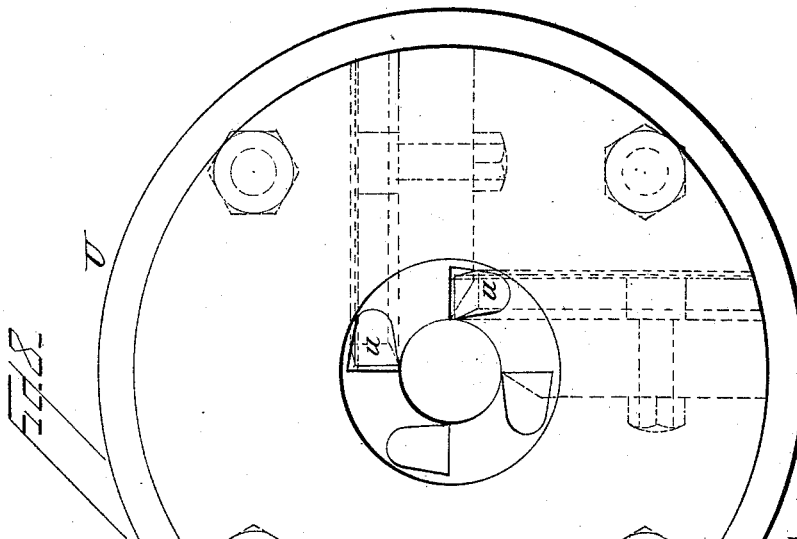

(No Model.) 9 Sheets—Sheet 7.
R. J. HOLMGREEN.
MACHINE FOR TURNING BROOM HANDLES.
No. 422,053. Patented Feb. 25, 1890.
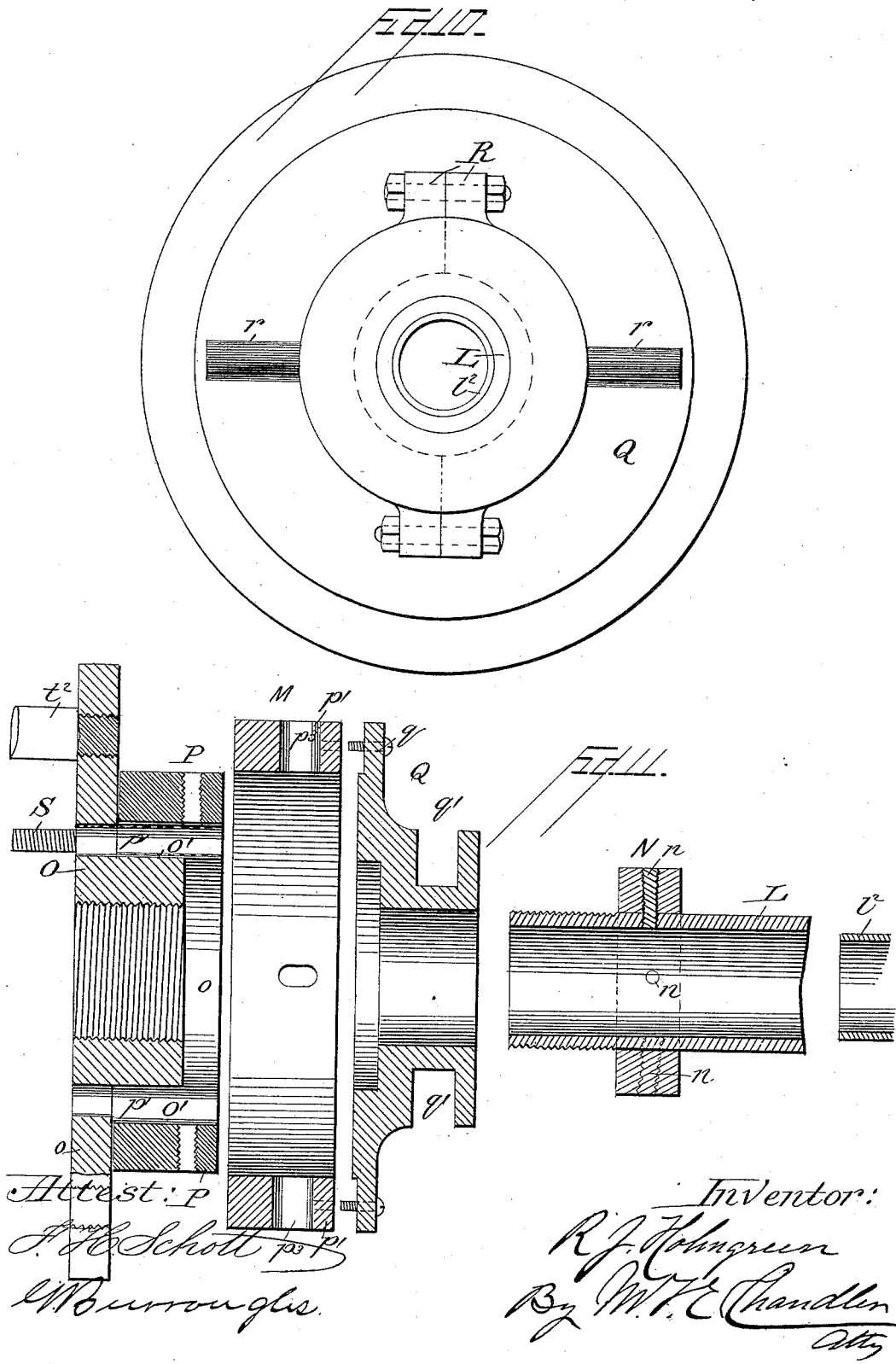

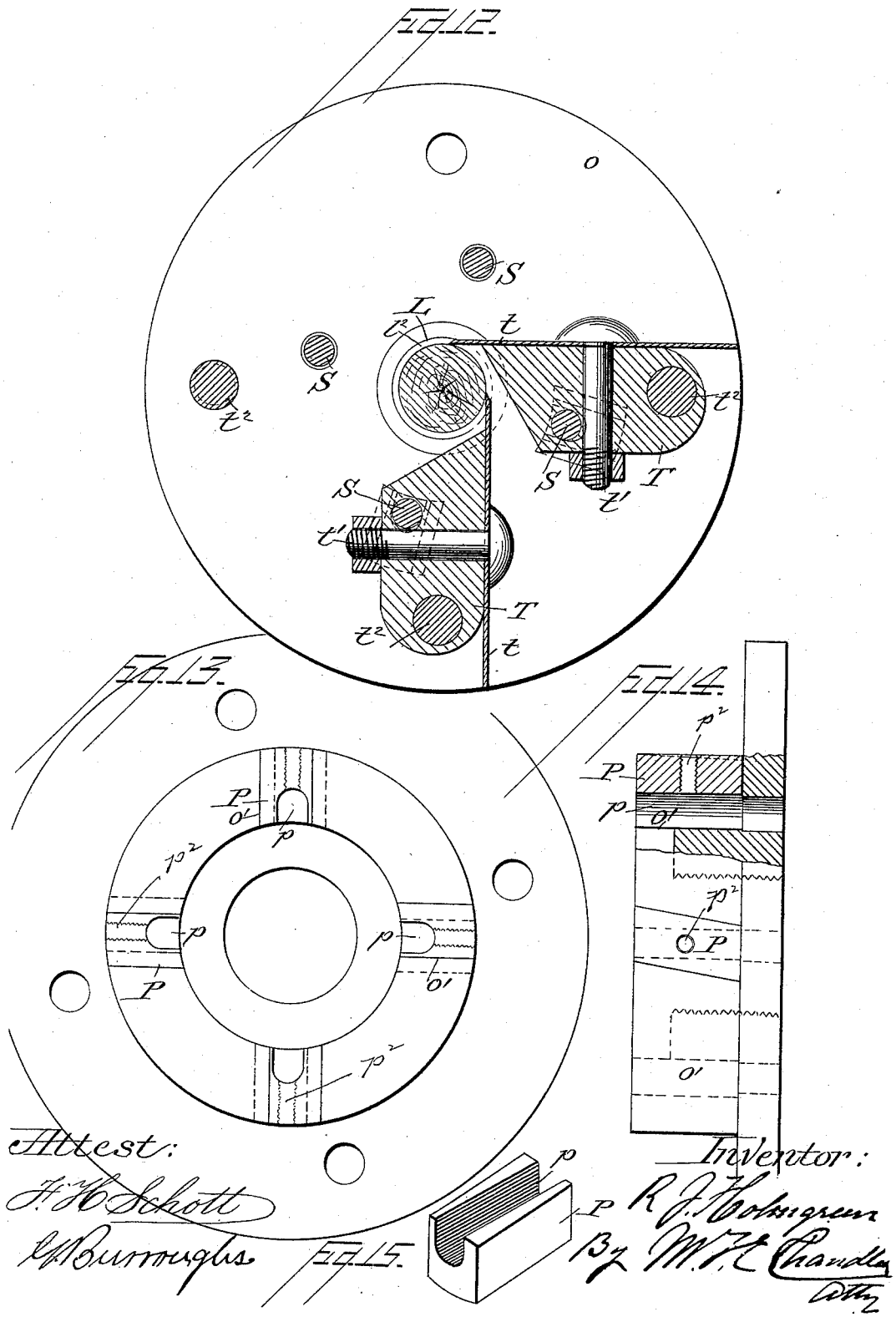

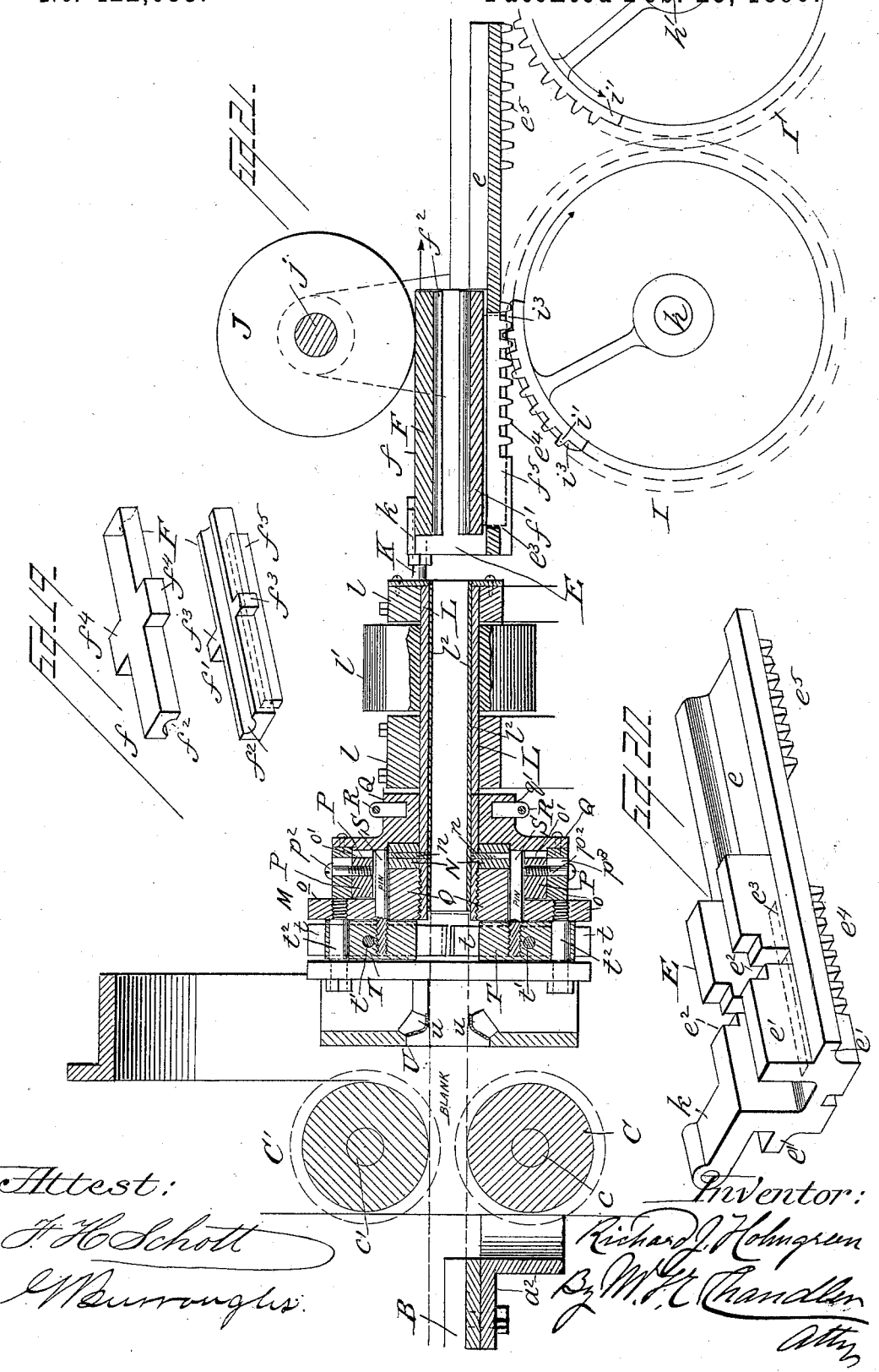

UNITED STATES PATENT OFFICE.

RICHARD J. HOLMGREEN, OF MUSKEGON, MICHIGAN.

MACHINE FOR TURNING BROOM-HANDLES.

SPECIFICATION forming part of Letters Patent No. 422,053, dated February 25, 1890.

Application filed April 27, 1889. Serial No. 308,804. (No model.)

*To all whom it may concern:*

Be it known that I, RICHARD J. HOLMGREEN, a citizen of the United States, residing at Muskegon, in the county of Muskegon and State of Michigan, have invented certain new and useful Improvements in Machines for Turning Broom-Handles; and I do declare the following to be a full, clear, and exact description of the invention, such as will enable others skilled in the art to which it appertains to make and use the same, reference being had to the accompanying drawings, and to the letters marked thereon, which form a part of this specification.

This invention relates to improvements in machines for turning the handles of brooms and other similar articles, the object being to produce a machine that will act automatically in taking the handle-blanks from the receptacle containing them, in giving the said blanks the proper taper while being rounded by the turning-tools, and in delivering the finished handles from the machine; and it consists in the construction and novel combinations of parts hereinafter described, illustrated in the accompanying drawings, and pointed out in the claims hereunto appended.

In the accompanying drawings, in which similar letters of reference designate corresponding parts in the different figures, Figure 1 represents a plan view of a machine embodying the invention. Fig. 2 is a side elevation thereof. Fig. 3 is a front elevation of the machine with the feed-trough detached. Fig. 4 is a rear elevation thereof. Fig. 5 is a transverse partial section on the line $x\ x$ of Fig. 1. Fig. 6 is a transverse partial section on the line $y\ y$ of Fig. 1. Fig. 7 is a detail side view of the vise-holder and actuating gear-wheels. Fig. 8 is a face view of the cutter-head, two of the roughing-knives being removed. Fig. 9 is a section of the cutter-head parallel to its face and inside of the chuck-disk of the roughing-knives. Fig. 10 is a rear view of the cutter-head. Fig. 11 is a central longitudinal section of one-half of the cutter-head. Fig. 12 is a front view of the cutter-head with the knife-blocks in section. Figs. 13, 14, and 15 represent edge, end, and face views of the cutter-carrying plate with the inclines for shifting the position of the finishing-knives and the guide-block moving in said incline. Fig. 16 is a perspective view of the feed-trough. Fig. 17 is a cross-section of the same. Fig. 18 shows the feed-finger by means of which the blanks are started. Fig. 19 shows the clamping-jaws of the vise. Fig. 20 represents the movable carriage in which the jaws are carried. Fig. 21 represents a vertical longitudinal section of the cutter-head, vise, and gears by which it is operated. Fig. 22 represents an edge view of one of the sectional gears. Fig. 23 represents a front and side view of the steel rib dividing the gear. Fig. 24 represents an end and side view of the adjustable pin which guides the finishing-knives.

The machine consists, essentially, of an automatic feed mechanism and a forming mechanism, of which the automatic tapering mechanism forms part.

In order to render the description more clear, the feed mechanism will be considered first and apart, after which the forming mechanism will be considered.

Referring to the drawings by letter, A designates the horizontal bed-plate of the machine, commonly of cast-iron, and provided with open spaces and transverse bars, in the usual manner, for the accommodation of the mechanism mounted upon it. The said bed-plate has depending sides and is flanged at its ends through openings, in which flanges it is bolted to the front and rear legs $a\ a'$, respectively, also of cast-iron, and which rise above the bed-plate to suitable heights. The legs and the longitudinal and transverse bars of the bed-plate are all preferably ribbed on their inner surfaces in the usual manner to strengthen them. Each pair of legs $a\ a'$ is connected above by a cross-piece, preferably convex upward, which may either be integral with the legs or bolted thereto.

$a^2$ designates a supporting-bracket rounded inward at its ends, having a depending flange along its inner edge, and bolted through openings near the ends of said flange to the front ends of the side bars of the bed-plate.

B designates the feed-trough, bolted at its inner end to the central part of the supporting-bracket $a^2$, provided with upstanding sides and having its outer end portion enlarged both vertically and to one side in order to form the vertical plate-chamber $b$ on the side of the cavity of the trough, which chamber communicates with said cavity through the longitudinal slot $b'$ in the intervening wall, and has a similar but wider longitudinal slot $b^2$ in its outer wall. The said slots are open at the end of the trough and are in practice about eight inches long. A suitable receptacle (not shown) rests above the feed-trough and contains the handle-blanks, rectangular in cross-section, and piled upon each other, the lowest resting in the feed-trough, in which it loosely fits. The outer end of the feed-trough is of suitable form, and is supported upon a standard or leg secured to and rising from the floor, or to the support on which the machine rests.

C C', Figs. 1 and 3, are similar feed-rollers secured, respectively, upon the parallel transverse shafts $c$ $c'$, which are journaled in bearings secured to the front legs of the machine at proper heights to bring the space between the rollers into alignment with the blank lying in the feed-trough, the shaft $c$ being below the shaft $c'$. The said rollers stand in the central vertical plane of the machine, and motion is imparted from the shaft $c$ to the shaft $c'$ by the meshing gear-wheels $c^2$ $c^2$ on said shaft to one side of the rollers. The said rollers have aligned guide-flanges $c^3$ on one side of the space between them to prevent the entering handle-blank from getting out of alignment.

The shaft $c$ is extended beyond its bearing for a suitable distance on the side of the rollers opposite that carrying the guide-flanges, and has on its extended end a miter gear-wheel $c^4$, which meshes with an equal-sized miter gear-wheel $d$ on the front end of a longitudinal counter-shaft D, journaled in bearings secured to or made upon the arms $d'$, extending outward from the corresponding sides of the bed-plate. The said counter-shaft has secured upon it at a suitable point a pulley $d^2$, by means of which and a belt the counter-shaft is rotated from any suitable motor, and by means of the described intermeshing gearing $d$ $c^4$ and $c^2$ $c^2$ the adjacent front sides of the feed-rollers are moved inward and will draw the handle-blank inward when engaged between them. Between the feed-rollers and the remainder of the feed mechanism intervene the cutter-head and hollow shaft carrying the same, which are part of the forming mechanism and are hereinafter described.

E designates a vise cage or holder in rear of said holder-shaft and consisting of the plate portion $e$, with the curved lateral walls $e'$, the vertical lateral walls $e^2$, extending for a proper distance from its front end and provided with the opposite T-shaped notches $e^2$, and having in its floor the central longitudinal slot $e^3$. At suitable points apart on the lower surface of the vise-holder are the similar racks $e^4$ $e^5$, the former being in front of the latter and each having an equal number of teeth, preferably about eight. The base of the vise-holder below the flanges $e'$ fits and reciprocates in a slot $e^6$ in the central line of the bed-plate.

F is the vise, consisting of the upper section $f$ and the lower section $f'$, each having a longitudinal nearly semicircular groove $f^2$ on its meeting surface, which grooves register with each other and are of proper size to grasp the rounded inner end of the handle that is being formed, the space between the grooves being aligned with that between the feed-rollers. The said sections are of general rectangular shape, and the lower one has centrally upon it the lateral extensions $f^3$, that fit in the vertical stem portions of the notches or openings $e''$ in the holder E, while the upper section is provided with similar central lateral projections $f^4$, that fit in the cross portions of said notches. The difference in width of the vertical and cross portions of the T-shaped notches prevent the sections from coming in contact.

$f^5$ is a central longitudinal projection depending from the lower section $f'$ and passing through the slot $e^3$. On account of the said projections it is evident that the vise must reciprocate with the holder.

The following are the means by which the holder and vise are reciprocated.

G is a miter gear-wheel, engaging an equal-sized miter-gear G' on the rear end of the shaft E, outside the rear bearing thereof, and mounted and turning on a cylindrical arm $g$, secured to and standing at right angles from the adjacent side of the bed-plate. The said miter-gear G has its hub $g'$ formed into a pinion, which meshes with a gear-wheel H, secured upon a transverse shaft $h$, journaled in bearings formed in projections depending from the sides of the bed-frame.

$h'$ is a shaft similar to the shaft $h$ and journaled in bearings secured to the rear legs of the bed-plate.

The shafts $h'$ $h'$ are at equal distances below the bed-plate, and upon them are secured, respectively, the gear-wheels I I', which are of equal size and intermesh. The wheel I is driven from the counter-shaft D by the described connecting-gearing and rotates the wheel I' in the opposite direction.

The gear-wheels I I' each have a lateral extension under the vise-holder, across the face of which extensions their teeth extend, the teeth crossing each extension being preferably about eight. The teeth in the extension $i$ of the front wheel I engage the front rack $e^4$ of the vise-holder, and the teeth in the extension $i'$ of the rear wheel I' engage the rear rack $e^5$. The extensions are relatively so situated on the gear-wheels that when one is engaging the corresponding rack the other is disengaged. Consequently the continuous rotation of the gear-wheels will reciprocate the vise-holder and contained vise as the wheels rotate in opposite directions.

The face of the extension $i$ of the gear-wheel I, that moves the vise-holder rearward, is crossed by a longitudinal groove $i^2$ deeper than the pitch-line of the wheel, and in this groove is secured the curved steel rib $i^3$, the ends of which rest in the bottom of the groove, while its central portions rise to the said pitch-line. When the wheel I moves the vise-holder rearward, the said rib $i^3$ bears on the longitudinal projection $f^5$ of the lower section of the vise and raises said section in the vise-holder. This action would only approximate the two sections and not bind them together but for the idler-wheel J, which is secured to a transverse shaft $j'$, journaled in bearings $j''$ of suitable construction, and which rises to a sufficient height from and above the bed-plate. The said idler-wheel bears on the upper section of the vise and keeps it from rising in the vise-holder. Consequently, when the lower section rises the two sections will bind upon the adjacent end of the handle when inserted between them, and as the gear-wheel I moves the vise rearward, as described, the latter will drag the handle with it. This action is necessary, because the head being in rear of the feed-roller C C' the latter cannot force the handle past the same, but can only carry it far enough to insert its finished end between the sections of the vise which is then nearest the said rollers and which seizes the handle in the manner described and drags it past the cutter-head. The gear-wheel I then returns the vise to its former position ready for another handle.

K is a rod with its threaded rear end secured by jam-nuts on an eye in a lateral extension $k$ of the vise-holder. The front end of said rod screws into a threaded opening in a projection standing from the outer side of a feed-plate $k'$, which stands in the chambers $b$ of the feed-trough, the said projection passing out of the slot $b^2$ to engage the rod K. The plate $k'$ is provided with a finger $k^2$, which passes into the cavity of the feed-trough through the slot $b$ and rests against the outer end of the handle-blank in said trough.

As the vise-holder and vise move rearward to draw the handle in the machine past the forming-knives the rod K will obviously cause the finger $k^2$ to force the blank in the feed-trough between the rollers, which will then carry it on into the machine in the manner described, each entering handle forcing rearward and out of the machine the one preceding it.

The foregoing completes the description of the feeding mechanism. The following is the description of the forming mechanism:

L is a hollow longitudinal steel shaft standing between the feed-rollers and vise and journaled at its ends in bearings $l\ l$, of proper construction, rising from the bed-plate. The said shaft carries a pulley $l'$, by means of which and a belt it can be driven by a proper motor.

$l^2$ is a stationary tube standing axially within the hollow shaft to keep the finished handle from getting out of alignment and touching the interior of the latter. The said tube is secured at its rear end to a plate $l^3$, secured to the rear surface of the rear bearing $l$ of the hollow shaft.

M is the cutter-head secured to the front end of the hollow shaft just in rear of the feed-rollers and in front of the front bearing $l$. The cutter-head is composed of the following parts arranged in the following manner:

N is a collar of steel shrunk upon the hollow shaft about an inch and a quarter from the front end of the latter, which is externally threaded between said end and collar. The collar is further secured in place by four pins $n$, tapped through it into the shaft, as shown.

O is a steel collar screwing upon the threaded end of the shaft L down to the collar N, having the same thickness as the latter and provided with the deep circumferential flange $o$ at right angles to the shaft L and forming the chuck for the tapering mechanism. The outer surface of the collar O is provided with four wide equidistant grooves $o'$, which also extend a sufficient length into the outer surface or face of the collar N' and incline from without in the direction opposite to that in which the head rotates.

P P are bronze blocks fitted into the grooves $o$ and capable of sliding therein. The sides of the said blocks are of course inclined to the axis of the cutter-head as they stand in the grooves $o'$, but their ends are at right angles to said axis. Consequently the blocks, while quadrilateral, are not rectangular, and they are provided in their inner surfaces with the grooves $p$, parallel to the axis of the cutter-head. Hence these grooves must be inclined to the sides of the blocks. The blocks P are provided with transversely-threaded openings, by means of which and the screws $p^2$ they are loosely bound to the metal ring $p'$, that surrounds the cutter-head outside of the blocks. The said ring is provided with the slots $p^3$ parallel with the axis of the cutter-head for the passage of the screws $p^2$.

Q is a collar shrunk or otherwise fitted upon the hollow shaft L and provided with the inner circumferential flange $q$, that fits against the outer end of the ring $p'$, and is secured thereto by screws, the outer surfaces of the ring and flange being flush. The hub of said collar is provided with the circumferential groove $q'$, into which fits the bronze strap R, made in two sections, provided with meeting projections bolted together similarly to an eccentric-strap, and having at opposite points horizontally the trunnions $r$. The said strap does not rotate the cutter-head. Now it is evident that when the strap R moves either outward or inward it will carry with it the collar Q, the ring $p'$, and the blocks P, but no other parts of the cutter-head.

S designates cylindrical pins which stand in the grooves $p$ of the blocks P, and the outer threaded ends of which screw into the knife-blocks T outside of the flange $o$ of the collar Q, the said pins passing through suitable openings in said flange. The knife-blocks are four in number, and have the tapering-knives $t$ secured to them by the screws and nuts $t'$, that engage through transversely-threaded openings in the knife-blocks. The knife-blocks are pivoted near their rounded outer ends upon the central unthreaded portions of the bolts $t^2$, the inner ends of which screw into openings in the flange $o$, their outer ends passing through registering openings in the chuck-disk U of the roughing-knives, outside of which disk said ends are tapped and engaged by nuts.

The roughing-knives $u$ are intended to merely round the blanks, which are originally square, as the said blanks pass through the outer orifice of the central opening of the cutter-head. The said roughing-knives may have their shanks set in standards, and may be moved inward or outward into position by screws or bolts having inclined ends to fit against inclined shoulders on said shanks and nuts on the opposite ends of the screws or bolts to move them outward or inward.

The means by which the tapering-knives $t$ are automatically operated are as follows:

V, Figs. 2 and 3, is a gear-wheel secured upon a shaft $v$, journaled in bearings of suitable construction secured to the front legs of the bed-plate below the latter, and meshing with the gear-wheel $c^2$ on the shaft $c$ of the lower feed-roller C and receiving motion therefrom.

$v'$ is a cam-disk secured upon the shaft $v$ at a suitable point, against which cam-disk bears the flattened point of a pin $w$, screwed into the lower end of an arm W', depending from a transverse rock-shaft W, turning on cone-points $w^2$, secured to projections depending from the sides of the bed-plate. Standing upward from said rock-shaft are the similar arms X X, having eyes or bearings in their ends for the insertion of the trunnions $r$ of the strap R. As the cam-disk turns with the shaft $v$, it moves the arm W' by means of the pin $w$, rocks the shaft W, and similarly moves the arms X. The said arms move the strap R outward from the front of the cutter-head, and the strap draws similarly outward the collar Q, ring $p'$, and sliding blocks P, which are all connected together, as described, causing the said blocks to slide in the grooves $o'$ of the collar O. The ring $p'$ and blocks P must be somewhat loosely fitted together to permit this; but, as the inclination of the grooves is slight, it can be easily accomplished. The above movement of the blocks P causes the pins S, in consequence of the inclination of the grooves $p$ to the sides of the blocks, to move slightly in the direction opposite that of the rotation of the cutter-head, causing the knife-blocks T to turn on the bolts $t^2$ and turn the points of the knives inward. This motion takes place gradually, so that the handle is gradually tapered from its inner to its outer end. As the projecting point of the cam-disk passes the pin $w$, the blocks and knives are thrown into their former positions by the continued action of the cam upon the pin.

All parts are so arranged that the inward movement of the handle by the feeding mechanism and the tapering thereof shall occur simultaneously.

Of course more than four tapering-knives and four roughing-knives might be used; but that number is most convenient, and in all cases the number of blocks P must be equal to that of the tapering-knives.

If any one of the tapering-knives should cut deeper than the others, its inclination can be properly changed by loosening the corresponding screw $p^2$, moving the corresponding block P sufficiently inward from the flange $o$ to get the proper inclination, and again binding the block to the ring $p'$ by said screw.

Having thus described my invention, I claim—

1. In a machine for turning broom-handles, the combination of the feed-rollers that draw the handle-blanks into the machine, and the automatically-reciprocated vise arranged to grasp the entering ends of said blanks before they have passed the feed-rollers and draw them through the cutter-head between said rollers and vise, substantially as specified.

2. In a machine for turning broom-handles, the combination of the feed-rollers, the feed-trough, the automatically-reciprocated feed-plate provided with a finger to force the handle-blanks in said trough between the said rollers, and the automatically-reciprocated vise to simultaneously grasp the inner end of the preceding blank and draw the same through the cutter-head in rear of the feed-rollers, substantially as specified.

3. In a machine for turning broom-handles, the combination of the feed-trough, the feed-rollers, the automatically-reciprocating feed-plate arranged to force the handle-blanks between the feed-rollers, the automatically-reciprocated vise to grasp said blanks before they have passed the rollers, and the rod connecting said vise and plate and causing them to act simultaneously, substantially as specified.

4. In a machine for turning broom-handles, the combination of a reciprocating vise-holder, a vise contained therein and moving therewith and arranged to grasp the inner end of a broom-handle as it begins its rearward motion and open at the end of said motion, and mechanism, substantially as described, whereby the said vise-holder is regularly reciprocated, substantially as specified.

5. In a machine for turning broom-handles, the combination of the vise, substantially as described, the vise-holder containing the vise and causing it to move with itself and having two racks at suitable distances apart on its under surface, and the intermeshing gear-wheels that move the vise-holder alternately in opposite directions, substantially as specified.

6. In a machine for turning broom-handles, the combination of the vise-holder having two racks on its under surface and the two intermeshing gear-wheels, each having a lateral projection into which the adjacent teeth extend and mesh with the corresponding rack of the vise-holder, the sectioned vise moving with said holder, the idler-wheel bearing on the upper section of the vise, the intermeshing gear-wheels reciprocating the vise-holder, and the steel rib inserted in a longitudinal groove in the lateral extension of the gear-wheel that moves the vise-holder rearward and with the idler-wheel causes the sections of the vise to bind on any intervening substance, substantially as specified.

7. In a machine for turning broom-handles, the combination, with the mechanism, substantially as described, to force the handle-blanks into the machine, of the reciprocating vise-holder having the opposite T-shaped notches in its sides, the vise consisting of the lower section with its lateral projections extending through the stems of said T-shaped notches and the upper section with its lateral projections resting on the cross part of said T-shaped notches, so as to keep the sections apart, the steel rib attached to the gear-wheel under the vise-holder, and the idler-wheel bearing on the upper section of the vise, substantially as specified.

8. In a machine for turning broom-handles, the combination of the vise-holder, the sectioned vise moving with said holder, the idler-wheel bearing on the upper section of the vise, the intermeshing gear-wheels reciprocating the vise-holder, and the steel rib inserted in a longitudinal groove in the lateral extension of the gear-wheel that moves the vise-holder rearward and with the idler-wheel causes the section of the vise to bind on any intervening substance, substantially as specified.

9. In a machine for turning broom-handles, the combination, with the cutter-heads rotating with the driving-shaft, of the knife-blocks pivoted therein, the tapering-knives secured to said blocks, and means, substantially as described, whereby the cutting-edges of said knives are gradually turned inward as the handle-blank is forced into the machine, substantially as specified.

10. The combination, with the hollow driving-shaft and the cutter-head secured to the front end thereof, of the feed-trough, the feed-rollers in front of the cutter-head, the reciprocating feed-plate, the reciprocating vise in rear of the driving-shaft, and the rod connecting the feed-trough and vise, substantially as specified.

11. In the cutter-head, the combination of the ring secured to the end of the hollow driving-shaft, provided with a flange forming the chuck for the tapering-knives, and having grooves in its outer surface inclining from said flange in the direction opposite that of the rotation of the hub, the pivoted knife-blocks, the blocks sliding in said grooves and provided with grooves parallel to the axis of the cutter-head, and the pins lying in said grooves and screwed to the corresponding knife-blocks, substantially as specified.

12. In the cutter-head, the combination of the grooved and flanged ring secured to the driving-shaft, the blocks sliding in the grooves therein, the pivoted knife-blocks, the pins lying in the grooves of the sliding blocks and screwed to the knife-blocks, the ring surrounding the sliding blocks and provided with transverse slots opposite thereto, and the screws passing through said slots and tapped into the sliding blocks, substantially as specified.

13. In the cutter-head, the combination of the grooved and flanged ring secured to the end of the driving-shaft, the blocks sliding in the grooves therein, the pivoted knife-blocks, the pins lying in the grooves of the sliding blocks and screwed to said sliding blocks, the flanged collar screwed through its flange to the rear edge of said ring, the sectioned strap seated in a circumferential groove in the hub of said flanged collar, and mechanism, substantially as described, whereby said ring is automatically moved back and forth.

14. In the cutter-head, the combination, with the grooved and flanged ring secured to the driving-shaft, the sliding blocks, the pivoted knife-blocks, the pins lying in the grooves of the sliding blocks and screwed to the knife-blocks, the ring surrounding and screwed to the sliding blocks, and the flanged collar screwed to said ring secured on the driving-shaft and provided with a circumferential groove, of the cam-wheel on a shaft journaled in the frame of the machine, the rock-shaft journaled in the frame of the machine, the arm depending from the rock-shaft, the pin standing from said arm against the cam-wheel, the arms standing from the rock-shaft, and the sectioned strap seated in the groove of the flanged collar with its trunnions journaled in bearings in the ends of the arms standing from the rock-shaft, substantially as specified.

In testimony whereof I affix my signature in presence of two witnesses.

RICHARD J. HOLMGREEN.

Witnesses:
 DANIEL UPTON, Sr.,
 DANIEL UPTON, Jr.